US006493431B1

(12) United States Patent
Troen-Krasnow et al.

(10) Patent No.: US 6,493,431 B1
(45) Date of Patent: Dec. 10, 2002

(54) METHOD AND SYSTEM FOR CAPTURING TELEPHONE CALLS

(75) Inventors: David Mark Troen-Krasnow, Needham, MA (US); Steven Richard Winnett, Brookline, MA (US)

(73) Assignees: Genuity Inc., Burlington, MA (US); Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/441,812

(22) Filed: Nov. 17, 1999

(51) Int. Cl.[7] .......................... H04M 1/64; H04M 1/56; H04M 3/42
(52) U.S. Cl. ............................. 379/88.12; 379/88.08; 379/88.09; 379/142.07; 379/201.01; 379/211.02; 379/212.01
(58) Field of Search ........................ 379/67.1, 69, 70, 379/88.09, 88.12, 88.13, 88.15, 88.17, 88.18, 88.19–88.21, 88.25, 93.24, 118, 170, 179, 201, 211–212, 217, 258, 261–268, 900, 908, 88.08, 88.11, 88.2, 112.03, 142.07, 142.15, 201.01, 201.02, 201.03, 201.05, 210.02, 211.02, 212.01, 214.01

(56) References Cited

U.S. PATENT DOCUMENTS

| | | | |
|---|---|---|---|
| 3,863,035 A | * 1/1975 | Lovell | 379/335 |
| 4,468,528 A | 8/1984 | Reece et al. | 179/18 B |
| 5,020,095 A | 5/1991 | Morganstein et al. | 379/67 |
| 5,027,384 A | * 6/1991 | Morganstein | 379/67.1 |
| 5,133,004 A | 7/1992 | Heileman, Jr. et al. | 379/67 |
| 5,521,965 A | * 5/1996 | D'Alessio et al. | 379/67.1 |
| 5,608,786 A | * 3/1997 | Gordon | 379/100 |
| 5,633,916 A | 5/1997 | Goldhagen et al. | 379/67 |
| 5,651,054 A | 7/1997 | Dunn et al. | 379/67 |
| 5,652,789 A | * 7/1997 | Miner et al. | 379/201 |
| 5,675,507 A | 10/1997 | Bobo, II et al. | 364/514 R |
| 5,724,406 A | 3/1998 | Juster | 379/67 |
| 5,742,668 A | 4/1998 | Pepe et al. | 379/58 |
| 5,742,905 A | * 4/1998 | Pepe et al. | 455/461 |
| 5,884,032 A | 3/1999 | Bateman et al. | 395/200.34 |
| 5,933,488 A | * 8/1999 | Marcus et al. | 379/217 |
| 5,946,386 A | * 8/1999 | Rogers et al. | 379/265 |
| 6,108,518 A | * 8/2000 | Madour et al. | 455/31.2 |
| RE37,001 E | * 12/2000 | Morganstein | 379/67.1 |

* cited by examiner

Primary Examiner—Allan Hoosain
(74) Attorney, Agent, or Firm—Leonard Charles Suchyta; James K. Weixel

(57) ABSTRACT

A server facilitates communication between a calling party and a called party. The server includes a communications interface for enabling communications with the calling party. The server also includes a processing device that receives a telephone call from the calling party and identifies the calling party. The processing device then determines whether the calling party is a predetermined party and transmits a notification to the called party when the calling party is the predetermined party.

32 Claims, 5 Drawing Sheets

METHOD AND SYSTEM FOR CAPTURING TELEPHONE CALLS

FIELD OF THE INVENTION

The present invention relates generally to telecommunications and, more particularly, to systems and methods for capturing information from telephone callers.

BACKGROUND OF THE INVENTION

A typical business often has a number of telephone lines for receiving and placing telephone calls. Often, the number of calls originating and terminating at the business exceeds the number of telephone lines available. When this occurs, a caller trying to reach the business, such as a customer or a vendor, receives a busy signal.

The business may subscribe to a conventional off-premises voice mail system offered by a local exchange carrier (LEC). The voice mail system typically enables a caller to leave a message that can be retrieved by the business at a later time. To retrieve the message, the business must typically access their voice mailbox, enter an access code and retrieve the messages in the order in which they were left.

Retrieving messages in this manner is time-consuming and inefficient. Additionally, the business may be unaware of the received messages for a long period of time. Therefore, a need exists to overcome the deficiencies of conventional off-premises voice mail systems.

The business may also request that the local phone company analyze the frequency of busy signals being offered to incoming calls. Even when such an analysis is available, the analysis is typically devoid of specific identifying information, such as who called, which is vital to the business when making an overall determination of whether it is using its existing phone lines efficiently.

SUMMARY OF THE INVENTION

Systems and methods consistent with the present invention address this need by permitting a user to automatically receive messages left by callers. The messages may be received via a number of different communication devices, including a computer or a pager. Systems and methods consistent with the present invention also provide both the business and the LEC with relevant information to enable them to determine, individually or together, how efficiently the business is using its telephone line capacity and how to efficiently manage this resource to meet the business's goals.

In accordance with the purpose of the invention as embodied and broadly described herein, a server consistent with the present invention includes a communications interface configured to enable communications with a calling party. The server also includes a processing device configured to receive a telephone call from a calling party for a called party, identify the calling party, determine whether the calling party is a predetermined party, and transmit a notification to the called party when the calling party is the predetermined party.

In another implementation consistent with the present invention a computer-readable medium stores sequences of instructions that are executed by a processor. The instructions cause the processor to store a message of a calling party for a called party. The instructions further cause the processor to identify the calling party, determine whether the calling party is a predetermined party and transmit a notification to the called party when the calling party is the predetermined party.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention capture telephone messages when all telephone lines are busy or a call is not answered. The messages may then be automatically forwarded to the called party.

EXEMPLARY SYSTEM

Figure 1:
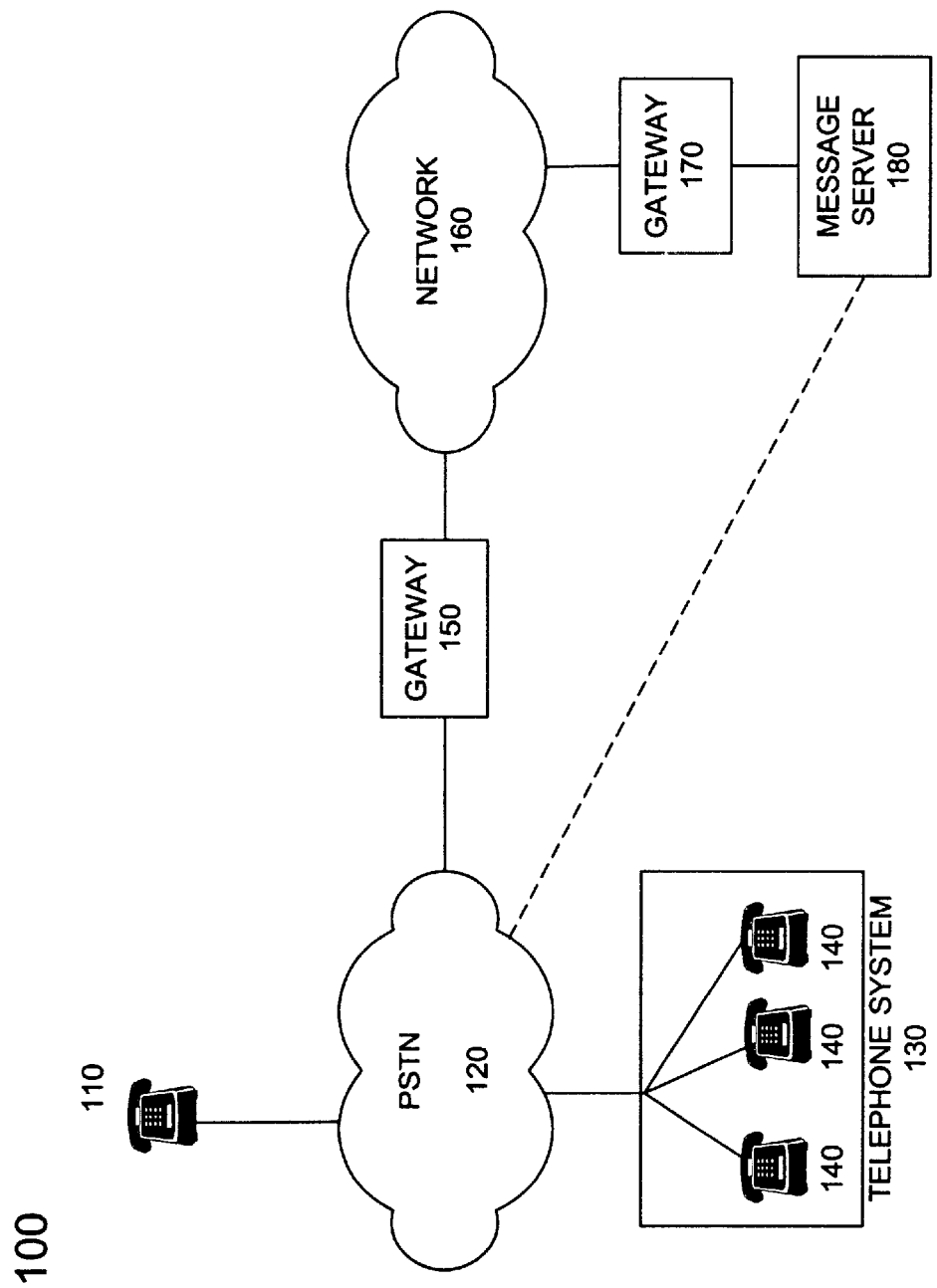
FIG. 1 is a diagram of an exemplary system consistent with the present invention.

FIG. 1 is an exemplary system 100 consistent with the present invention. The system 100 includes a telephone 110 representing a calling party, a Public Switched Telephone Network (PSTN) 120, telephone system 130 representing a called party, conventional gateways 150 and 170, a network 160, and a message server 180. The conventional gateway 150 connects PSTN 120 to network 160. The network 160 may include the Internet, an intranet, a LAN, a WAN, or an equivalent network. The network 160 connects to message server 180 via the conventional gateway 170.

The telephone 110 may include any conventional device that can place and receive telephone calls over PSTN 120. The telephone system 130 includes several telephones 140. Three telephones 140 are shown in telephone system 130 for simplicity. However, other numbers of telephones 140 may be included. Each of the telephones 140 may also be any type of conventional device that places and receives telephone calls over PSTN 120. Telephone system 130 may include a number of telephones 140 having the same telephone number and configured in a "hunt group." In such a configuration, when one of the telephones 140 is busy, the telephone system 130 automatically identifies an open telephone 140 and directs the call to the open telephone 140. Alternatively, the telephones 140 could each have separate telephone numbers with a "roll-over" feature where if the dialed line is busy, the telephone system 130 automatically directs the call to another telephone 140. In other implementations consistent with the present invention, the telephone system 130 may include a private branch exchange (PBX) switch or may be a single conventional telephone.

As described in more detail below, a caller via telephone 110 may communicate with message server 180 by initiating a telephone call to telephone system 130. The call may be forwarded to message server 180 over PSTN 120 via gateways 150 and 170 and network 160. In an alternative implementation consistent with the present invention, a call may be forwarded from a calling party directly to message server 180 via PSTN 120, as indicated by the dashed line in FIG. 1, bypassing network 160.

Figure 2:
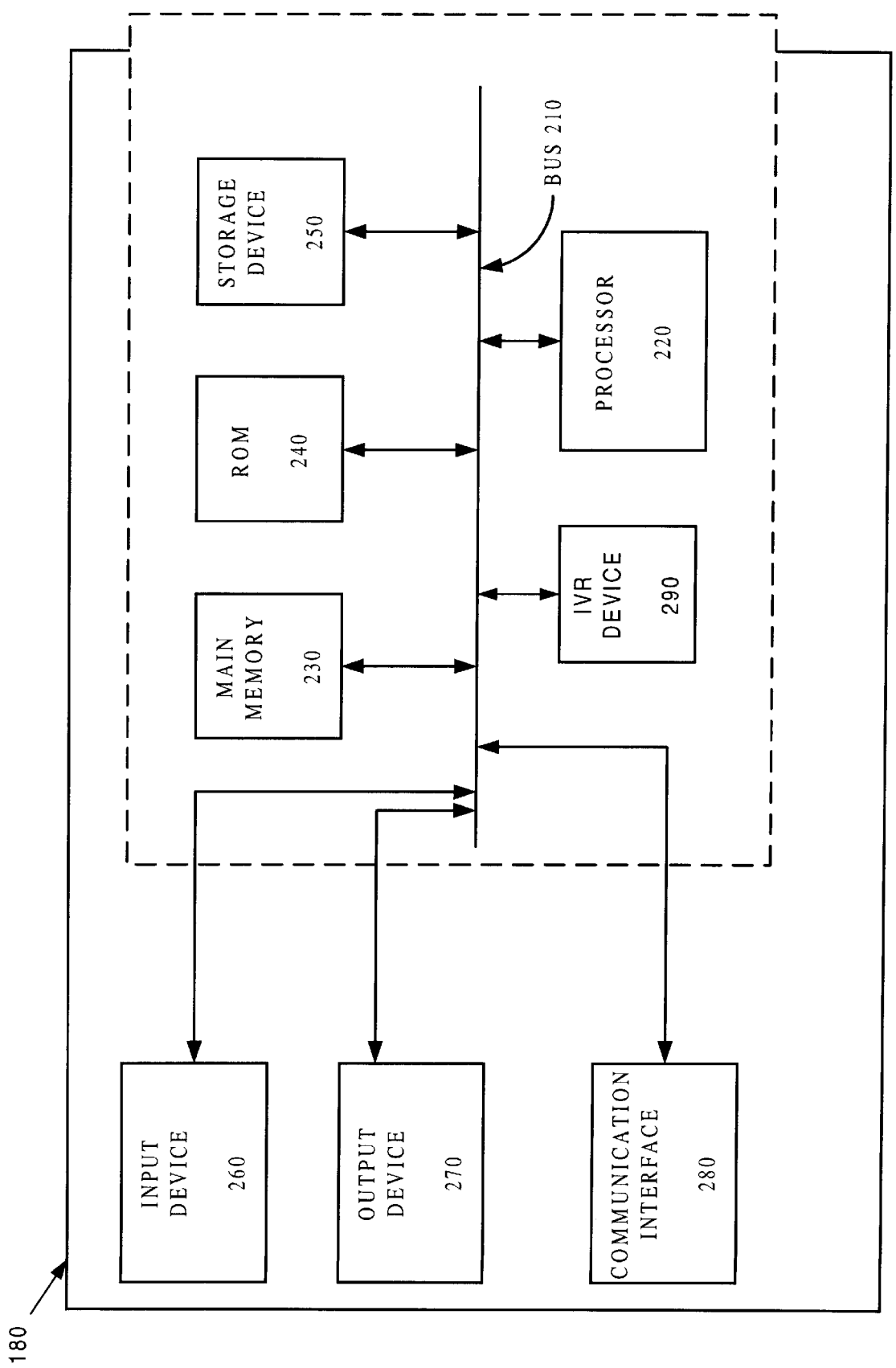
FIG. 2 is a detailed diagram of an exemplary server in the system of FIG. 1.

FIG. 2 is an exemplary diagram of the message server 180 of FIG. 1. The message server 180 includes a bus 210 or other communications medium for communicating information among the components and a processor 220 coupled to bus 210 that processes information. The processor 220 may be any type of conventional processor or microprocessor that interprets and executes instructions. Message server 180 further includes a random access memory (RAM) or other dynamic storage device 230 (referred to as main memory), coupled to bus 210, that stores information and instructions to be executed by processor 220. Main memory 230 may also be used to store temporary variables or other intermediate information used during execution of instructions by processor 220. Message server 180 also includes a read only memory (ROM) and/or other static storage device 240, coupled to bus 210, that stores static information and instructions for processor 220. A data storage device 250, such as a magnetic disk or optical disk and its corresponding disk drive, can be coupled to bus 210 to store information and instructions.

Message server 180 also includes an input device 260, an output device 270, and a communication interface 280. The input device 260 may include any conventional mechanism that permits an operator to input information into the message server 180, such a keyboard, a mouse, a pen, voice recognition and/or biometric mechanisms, etc. The output device 270 may include any conventional mechanism that outputs information to the operator, including a display, a printer, a pair of speakers, etc. The communication interface 280 may include any transceiver-like mechanism that enables the message server 180 to communicate with other devices and/or systems. For example, the communication interface 280 may include mechanisms for communicating via a data network, such as the Internet, a telephone network, such as PSTN 120 (FIG. 1), or a satellite.

The message server 180 may also include an interactive voice response (IVR) device 290. The IVR device 290 enables the message server 180 to provide voice responses and to receive input from callers using a conventional touch-tone telephone.

The message server 180, consistent with the present invention, enables a called party to receive messages. According to one implementation, message server 180 receives information from a calling party and transmits the information to a called party in response to processor 220 executing sequences of instructions contained in memory 230. Such instructions may be read into memory 230 from another computer-readable medium, such as a data storage device 250, or from a separate device via communication interface 280. Execution of the sequences of instructions contained in memory 230 causes processor 220 to perform the process steps that will be described hereafter. In alternative implementations, hard-wired circuitry may be used in place of or in combination with software instructions to implement the present invention. Thus, the present invention is not limited to any specific combination of hardware circuitry and software.

EXEMPLARY PROCESSING FOR CAPTURING TELEPHONE CALLS

Figure 3:
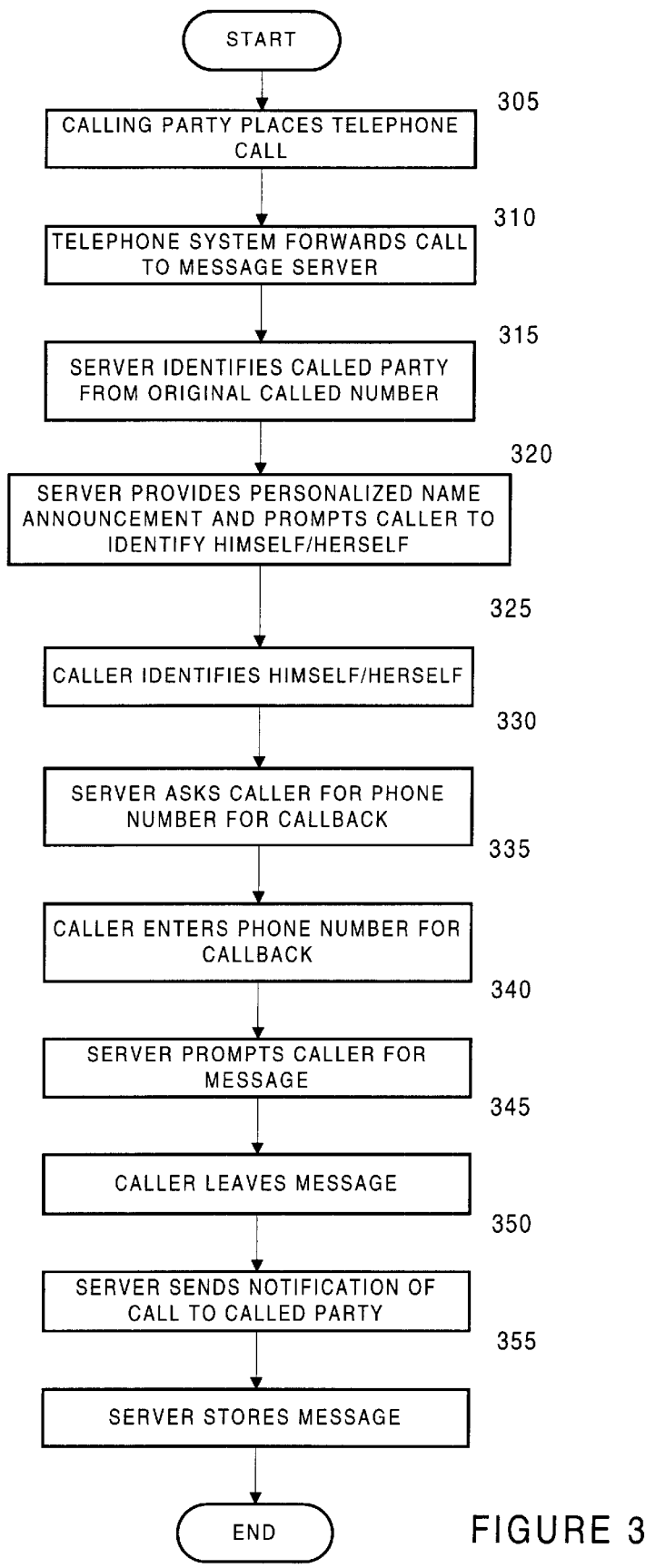
FIG. 3 is a flowchart of processing for capturing telephone messages in a manner consistent with the present invention.

FIG. 3 is a flowchart of processing for capturing telephone call information in a manner consistent with the present invention. Processing begins when a calling party, using for example telephone 110, initiates a telephone call to a called party represented by, for example, telephone system 130 (step 305). By calling the appropriate telephone number, the telephone 110 connects to the telephone system 130 via PSTN 120 in a conventional manner.

Assume that the telephone system 130 includes a conventional call-forwarding feature. Such call forwarding features are known and are not described in detail herein in order not to unduly obscure the thrust of the present invention. For example, the telephone system 130 may be configured to forward calls when all the telephones 140 in telephone system 130 are busy. In alternative implementations consistent with the present invention, the telephone system 130 may be configured to forward calls when no answer is received after a predetermined number of rings.

Assume that all the telephones 140 in telephone system 130 are busy or the calling party receives no answer, the telephone system 130 then forwards the telephone call to the message server 180 (step 310). The telephone system 130 forwards the telephone call to message server 180 via PSTN 120. The telephone call may be routed from PSTN 120 to the message server 180 via network 160. From network 160, the call may be routed via gateway 170 to the message server 180. In alternative implementations consistent with the present invention, the telephone call may be forwarded directly from telephone system 130 to message server 180 via PSTN 120, bypassing network 160.

In either case, the message server 180 receives the telephone call and reads the original called number, such as the Dialed Number Identification Service (DNIS), to identify the called party (step 315). In an implementation consistent with the present invention, the message server 180 then provides a personalized name announcement asking the calling party to identify himself/herself (step 320). For example, the message server 180 may transmit a voice message to the caller located at telephone 110 that states "XYZ Company. Who is calling please?" The calling party then identifies himself/herself (step 325).

The message server 180 may then provide a series of questions for the calling party. For example, the message server 180 may transmit a voice message requesting additional information from the calling party relating to a callback number (step 330). Such a message may state "Press 1 if you wish to be called back at<calling number>. If you wish to be called back at another number, press 2 and then enter the 10-digit telephone number. Thank you." The calling party may then enter a telephone number at which the calling party can be reached (step 335). In alternative implementations consistent with the present invention, the calling party may provide a number at which he/she wishes to be reached in his/her own voice. The message server 180 then uses a conventional voice-to-text converter that converts the voice-entered telephone number into a ten-digit telephone number for use by the message server 180.

The message server 180 may then provide a message that prompts the calling party to leave a message (step 340). For example, the message server 180 may provide "Please leave a message after the tone. Thank you. <tone>." The calling party may then leave a message (step 345). The message server 180 may also log telephone calls when the calling party leaves no message. In this case, the message server 180 stores the time of day, date and the calling party's telephone number. In this manner, the called party may be informed of telephone calls even when the calling party leaves no message.

Next, the message server 180 sends a notification to the called party that a call has been received (step 350). The notification message from the message server 180 may be an electronic mail (email) message transmitted to the called party's personal computer over a computer network.

Figure 4:
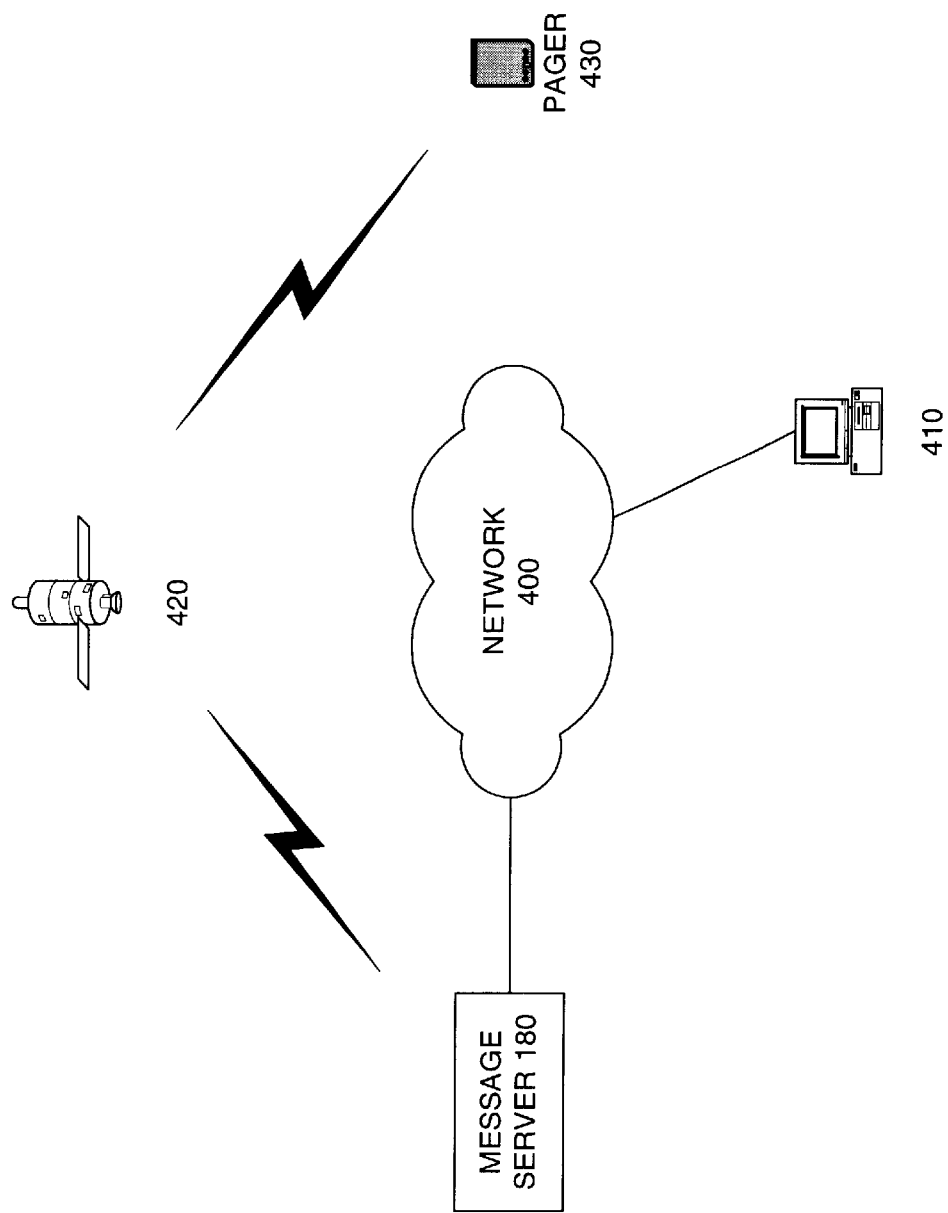
FIG. 4 is a diagram illustrating an exemplary system consistent with the present invention.

For example, referring to FIG. 4, the message server 180 may transmit an email message over network 400 to the called party's computer 410. The network 400 may include the Internet, an intranet, a LAN, a WAN, or an equivalent network to which the computer 410 has access. In this scenario, the message server 180 stores the email address of the called party, for example on storage device 250, and forwards the notification message using this stored address. The email message may include a streaming audio file storing the voice message left by the calling party in the calling party's own voice (steps 325, 335 and 345). In alternative implementations consistent with the present invention, the email message may include a text message listing the time of the call, the date and the calling party's telephone number. Alternatively, any combination of text and voice messages may be transmitted to the called party's computer 410 conveying the information relating to the telephone call.

Alternatively, the message server 180 may store the message at the message server 180 (step 355), for example on storage device 250. The called party may then access the message server 180 via network 400 to retrieve the message. For example, using computer 410, the called party may log onto the message server 180 via network 400 and retrieve the stored messages. In this scenario, the message server 180 may store a number of messages in the order received. After the called party logs on, the message server 180 may present the called party with a list of the stored messages displaying a portion of the contents of each message or the date/time that each message was received. The called party can then decide to access the stored messages in any desired order.

In another implementation consistent with the present invention, the message server 180 receives the message and telephone number from the calling party (steps 325, 335 and 345). The message server 180 then encodes the message and telephone number into a conventional paging signal and transmits the signal to the called party's pager 430 via satellite 420. In this scenario, the message server 180 stores the called party's pager number, for example on storage device 250, and transmits the information to the pager 430 using that number. The pager 430 receives the paging signal and notifies the paged party of its receipt in any conventional manner. For example, the pager 430 may notify the paged party by emitting an audible tone or by vibrating the pager 430 or by simply displaying a message on the pager's 430 display. Upon notifying the paged party, an encoder/decoder within the pager 430 decodes the transmitted signal and displays the decoded message on the pager display. If the pager is voice capable, the pager 430 may play the calling party's self-identification, display a callback number and play any voice message left by the calling party. In this manner, the called party may be immediately notified of a message left by a calling party.

In further implementations consistent with the present invention, the message server 180 may transmit any combination of email notifications and pager notifications. For example, the message server 180 may transmit a signal to the pager 430 indicating a telephone call has been received and then transmit the audio message to computer 410.

In still further implementations consistent with the present invention, the message server 180 may transmit a message to the called party's cellular telephone or personal digital assistant (PDA) using a conventional short message service (SMS) or may transmit a message to the called party's facsimile machine. The message server 180 may also transmit a notification message to any other device through which the called party wishes to be notified. In this way, the called party may choose the most convenient way in which he/she wishes to be notified of the telephone calls and the message server 180 transmits the notification in that manner.

EXEMPLARY PROCESSING FOR FILTERING MESSAGES

Figure 5:
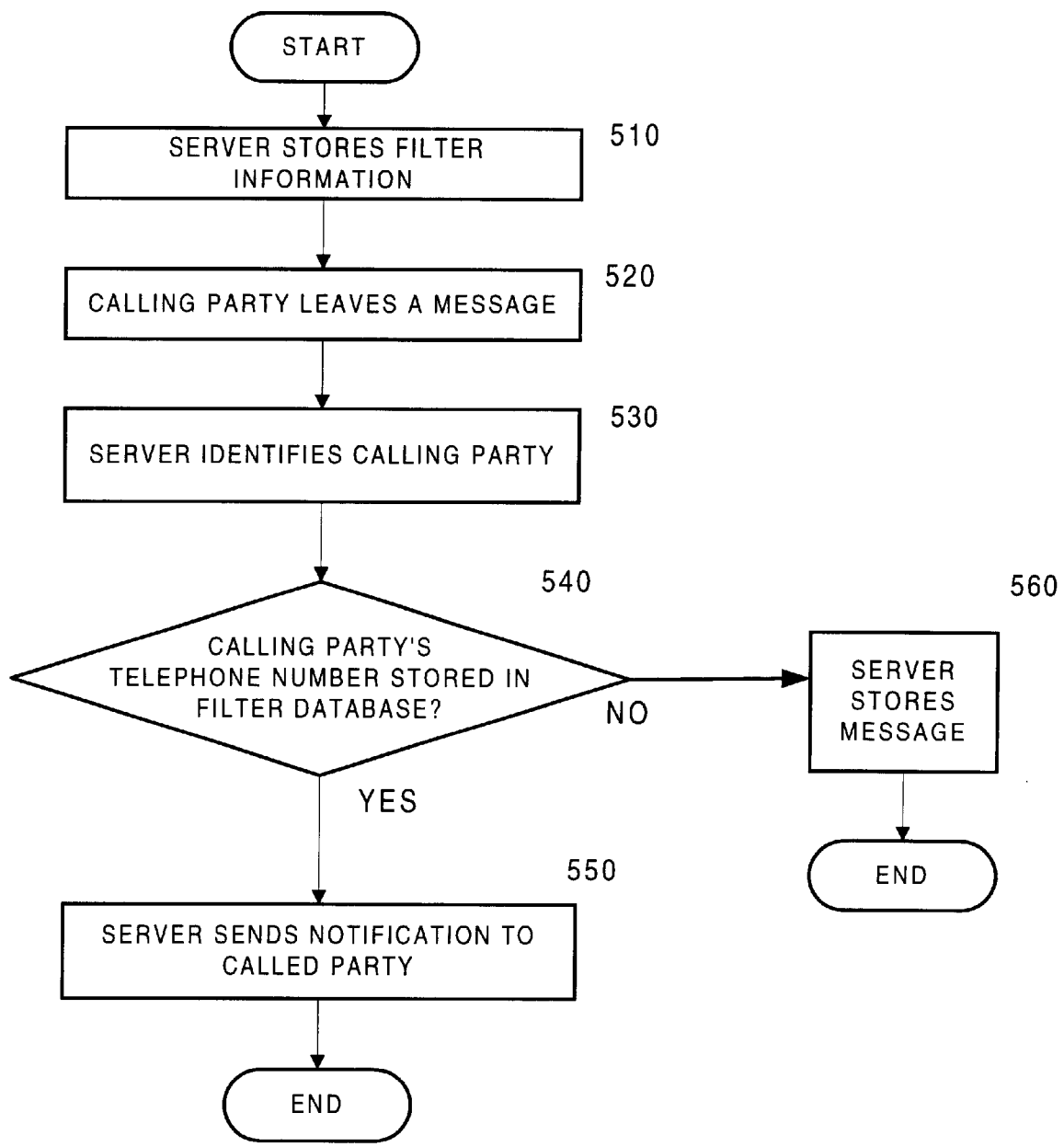
FIG. 5 is a flowchart of processing for filtering messages in a manner consistent with the present invention.

FIG. 5 is a flowchart of processing for filtering telephone messages in a manner consistent with the present invention. The message server 180 initially stores filter information relating to a called party, for example, on storage device 250 (step 510). The filter information may include a database of telephone numbers associated with the particular called party. For example, the filter information may include a list of telephone numbers of previous customers or vendors of the called party.

Next, assume that a calling party leaves a message at message server 180 (step 520). The message server 180 then identifies the calling party based on the calling party's telephone number, using, for example, caller ID (step 530). In alternative implementations consistent with the present invention, the message server 180 identifies the calling party based on the calling party's self-identification entered via a telephone keypad or via a voice message (FIG. 3, step 335). Next, the message server 180 determines whether the calling party's telephone number is stored in the filter database (step 540). If so, the message server 180 sends a notification to the called party that a message has been received (step 550). The notification may be any one of or any combination of the notifications previously discussed. For example, the notification may be an email message to computer 410, a page to pager 430, an SMS message to a cellular telephone, a facsimile transmission to a facsimile device, or a message to any other device or any combination of devices. In certain implementations consistent with the present invention, the filter database may categorize or prioritize telephone numbers. When a calling party having a high priority telephone number leaves a message, the message server 180 may then send a notification indicating that an important caller left a message. For example, the email message or paging signal may indicate that the message is a high priority message.

If the calling party is not in the filter database, the message server may store the message for later access by the called party (step 560). Alternatively, the message server 180 may transmit a notification to the called party indicating a normal priority associated with the received call.

In this manner, the message server 180 may advantageously prioritize messages based on criteria set by the called party. The message server 180 may then use these criteria to make intelligent routing and notification decisions to inform the called party of the message.

The message server 180 may also be used to provide real-time statistics regarding telephone calls to the telephone system 130. For example, the message server 180 may determine the likelihood of a calling party receiving a busy signal or receiving a voice mail message. The message server 180 may also identify the particular calling party receiving the busy signal and the number of times that the calling party received the busy signal. The message server 180 may further correlate the likelihood of the busy signal to the time of day, day of the week or any other factor. The message server 180 may also generate detailed reports based on the particular parameters being analyzed. In this manner, the message server 180 may aid a business in making decisions on whether to add additional telephone lines.

Systems and methods consistent with the present invention permit a message server to receive telephone calls for a called party. A notification message may then be quickly forwarded to the called party via any device through which the called party wishes to be notified. The messages may also be prioritized based on user-defined criteria.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A server comprising:
    a communications interface configured to enable communications with a calling party; and
    a processing device configured to:
        receive, from the calling party, a telephone call for a called party,
        store a voice message from the calling party,
        identify the calling party,
        determine whether the calling party is a predetermined party,
        transmit a notification to the called party when the calling party is the predetermined party, the notification including a priority indicator indicating a priority of the stored voice message, and
        determine a likelihood that the calling party's call will be forwarded to the processing device.

2. The server of claim 1, wherein the processing device is configured to identify the calling party based on the calling party's self-identification.

3. The server of claim 1, wherein the processing device is configured to identify the calling party based on the calling party's telephone number.

4. The server of claim 1, wherein the processing device is configured to transmit the notification via at least one of electronic mail, a paging system, and a cellular system.

5. The server of claim 1, wherein the notification includes the time of the telephone call and the telephone number of the calling party.

6. The server of claim 5, wherein the notification further includes the voice message from the calling party.

7. The server of claim 1, wherein the processing device is further configured to:
    transmit a personalized greeting to the calling party based on the identity of the called party;
    query the calling party for information; and
    store the information.

8. The server of claim 1, further comprising a memory configured to store telephone numbers of potential calling parties and a priority indicator relating to at least one of the telephone numbers.

9. The server of claim 1, wherein the processing device is configured to transmit the notification via a facsimile device.

10. A method of capturing telephone messages of a calling party for a called party, comprising:
    receiving a telephone call forwarded from a called party;
    identifying the calling party;
    storing a message from the calling party, thereby obtaining a stored message;
    determining whether the calling party is a predetermined party;
    transmitting a notification to the called party when the calling party is the predetermined party, the notification including a priority indicator indicating a priority of the stored message; and
    determining a likelihood that the calling party's telephone call will be forwarded to a voice mail system.

11. The method of claim 10, wherein the identifying includes identifying the calling party based on the calling party's self-identification.

12. The method of claim 10, wherein the identifying includes identifying the calling party based on the calling party's telephone number.

13. The method of claim 10, wherein the transmitting a notification includes sending the notification via at least one of electronic mail, a paging system, and a cellular system.

14. The method of claim 10, wherein the transmitting a notification includes sending information representing the time of the telephone call and the telephone number of the calling party.

15. The method of claim 14, wherein the transmitting a notification includes sending a voice message from the calling party.

16. The method of claim 10, further comprising:
    transmitting a personalized greeting to the calling party based on the identity of the called party;
    querying the calling party for information; and
    storing the information.

17. The method of claim 10, further comprising storing telephone numbers relating to potential calling parties and a priority indicator relating to at least one of the telephone numbers.

18. The method of claim 10, wherein the transmitting a notification includes sending the notification via a facsimile device.

19. A computer-readable medium having stored thereon a plurality of sequences of instructions which when executed by a processor, cause said processor to perform a method comprising:
    storing a message of a calling party for a called party, thereby obtaining a stored message;
    identifying the calling party;
    determining whether the calling party is a predetermined party;
    transmitting a notification to the called party when the calling party is the predetermined party, the notification including a priority indicator indicating a priority of the stored message; and
    determining a likelihood that a call from the calling party will be forwarded to a voice mail system.

20. The computer-readable medium of claim 19, wherein the identifying includes identifying the calling party based on the calling party's self-identification.

21. The computer-readable medium of claim 19, wherein the identifying includes identifying the calling party based on the calling party's telephone number.

22. The computer-readable medium of claim 19, wherein the transmitting a notification includes sending the notification via at least one of electronic mail, a paging system, and a cellular system.

23. The computer-readable medium of claim 19, wherein the transmitting a notification includes sending information representing the time of the telephone call and the telephone number of the calling party.

24. The computer-readable medium of claim 23, wherein the transmitting a notification includes sending a voice message from the calling party.

25. The computer-readable medium of claim 19, further including instructions for causing said processor to perform the steps of:

transmitting a personalized greeting to the calling party based on the identity of the called party;

querying the calling party for information; and storing the information.

26. The computer-readable medium of claim 19, further including instructions for causing said processor to perform the steps of:

determining a priority of the telephone call based on a stored indicator.

27. The computer-readable medium of claim 19, wherein the transmitting a notification includes sending the notification via a facsimile device.

28. A computer-readable medium having stored thereon a plurality of sequences of instructions which when executed by a processor, cause said processor to perform a method comprising:

receiving telephone calls for a called party;

providing at least one of a busy signal and a voice mail service in response to the received telephone calls;

analyzing a number of telephone calls received; and determining a likelihood of a calling party receiving at least one of the busy signal and the voice mail service.

29. A system for analyzing telephone calls for a called party, comprising:

a communications interface that enables communications with a calling party; and a message server coupled to the communications interface and configured to:

receive telephone calls forwarded from the called party, analyze a number of telephone calls received, and determine a likelihood that a calling party's call will be forwarded to the message server.

30. The system of claim 29, wherein the message server is further configured to:

determine the probability that a calling party's call will be forwarded to the message server at predetermined times.

31. A system for communicating with a calling party and a called party comprising:

means for receiving a telephone call from the calling party;

means for storing a voice message from the calling party;

means for determining whether the calling party is a predetermined party;

means for transmitting a notification to the called party when the calling party is the predetermined party, the notification including priority information indicating a priority of the voice message; and means for determining a likelihood that the calling party's call will be forwarded to the means for storing.

32. A method comprising:

providing voice mail service to a subscriber;

transferring a call from a calling party to the voice mail service, after a predetermined number of rings or when the subscriber's telephone is busy;

storing a message from the calling party, thereby obtaining a stored message;

determining whether a calling party is a predetermined party;

providing a notification to the subscriber of the stored message when the calling party is the predetermined party; and determining the likelihood that a call from a calling party will be transferred to the voice mail service.

* * * * *